INVENTORS
ARTHUR M. SWANSON
DOUGLAS J. FENSKE
BY *Joseph G. Werner*
ATTORNEY

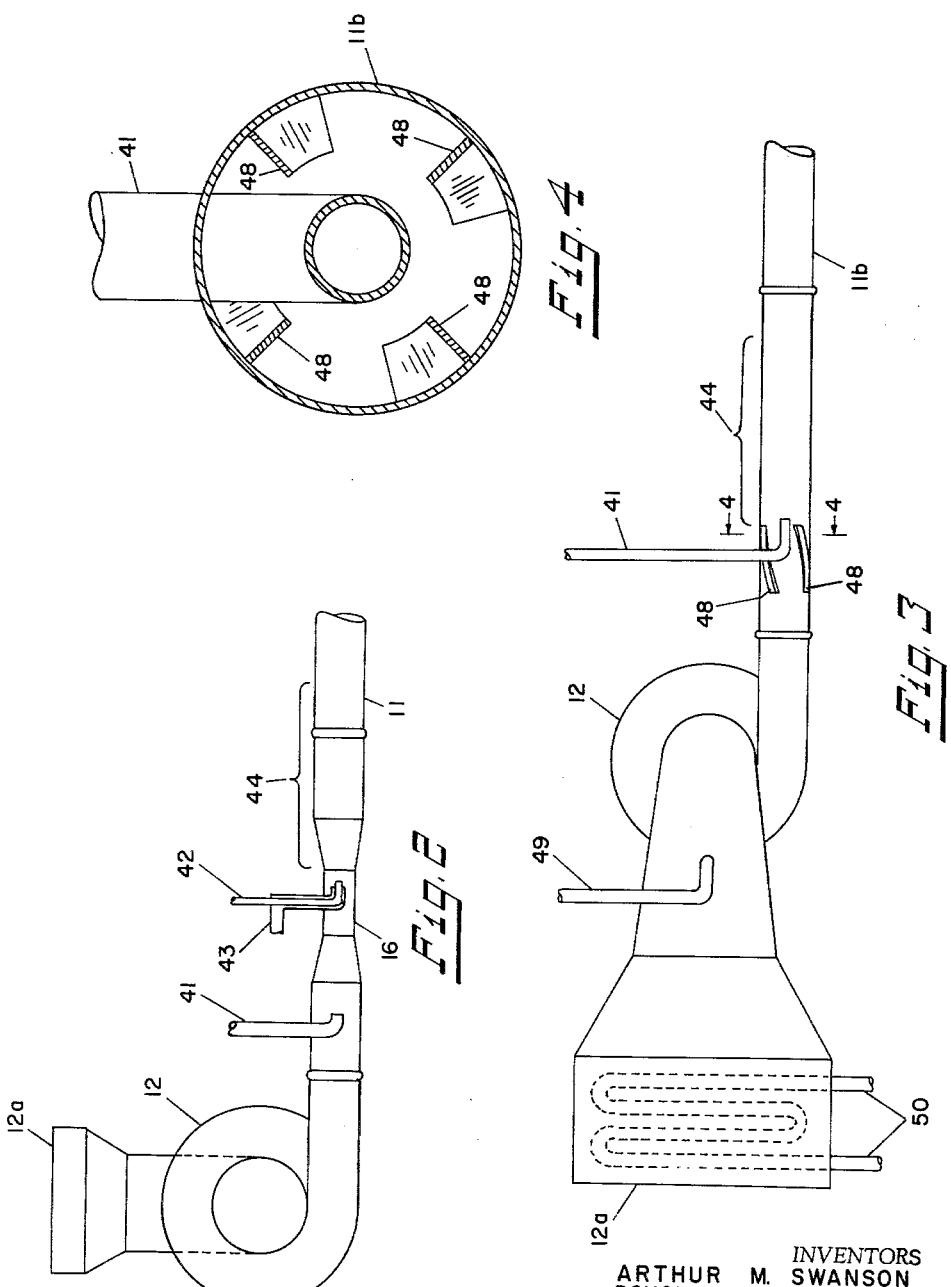

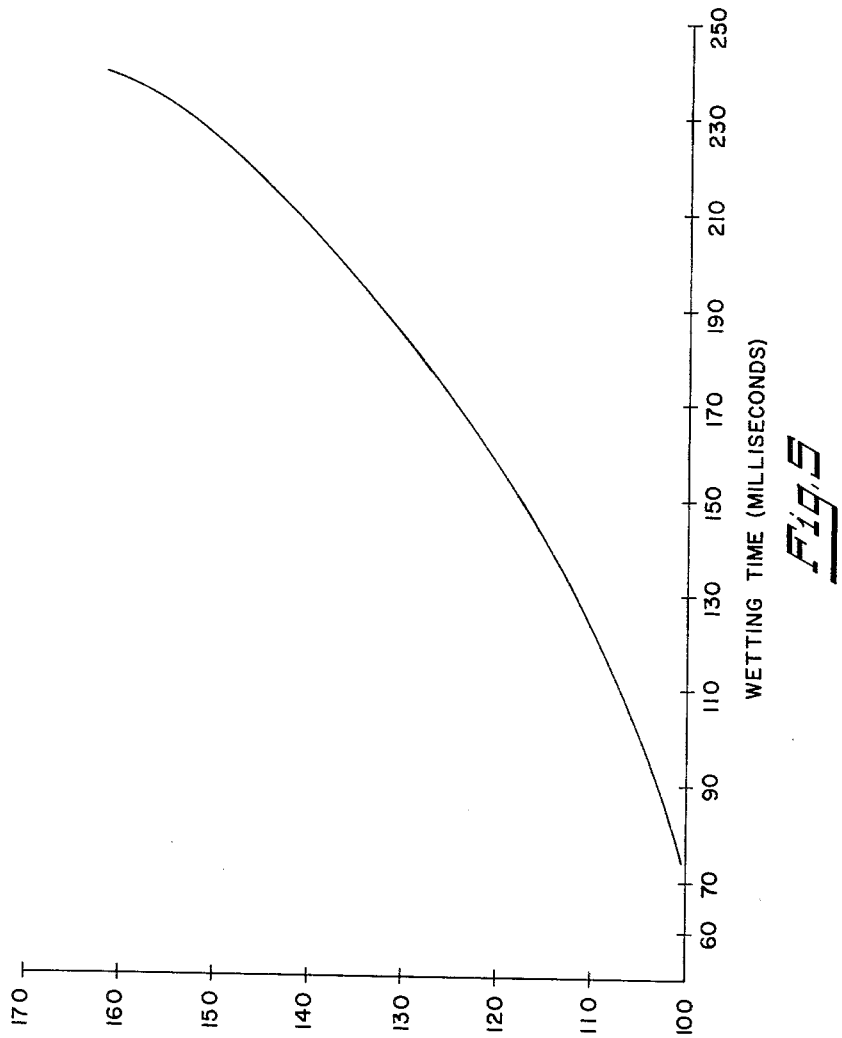

3,228,116
APPARATUS FOR AGGREGATING DIFFICULT TO AGGREGATE PARTICLES
Arthur M. Swanson, Madison, and Douglas J. Fenske, Tomah, Wis., assignors to Dairy-Mour, Inc., a corporation of Wisconsin
Filed Aug. 23, 1965, Ser. No. 481,874
7 Claims. (Cl. 34—57)

The application is a continuation-in-part of our co-pending application Serial No. 247,225, filed December 26, 1962.

The present invention relates to improvements in apparatus for aggregating dried particulate materials, and more particularly, apparatus for aggregating previously difficult to aggregate dried particulate materials.

Most dried materials commercially available today are in the form of relatively small, particulate particles. This is true of spray dried, roller dried, tray dried, or belt dried in atmosphere or vacuum, and crystallized materials. The spray dried materials are in the form of small particulate particles when they are removed from the drier, whereas the products resulting from roller, tray or belt drying and crystallizing processes are pulverized after being removed from the driers and the crystallizer in order to give a fairly uniform particle size and appearance to the product. The resulting particle size of all of the above mentioned products is approximately the same, and is so exceedingly small that the particles will tend to "ball up" or form incompletely wetted lumps when they are added to a suitable liquid. Use of such products thereof requires a great deal of time and effort to effect satisfactory reconstitution in water or other liquid. Such poor wetting and reconstituting characteristics have handicapped the popular acceptance of these finely divided dried materials.

It is well known that when certain finely divided particles are "aggregated," the wettability and dispersability of such materials in liquids is greatly increased. An example of such an aggregated product is the product commonly known as "instant" nonfat dry milk.

"Aggregation" is a process whereby small particulate particles are caused to adhere to each other in random fashion, resulting in porous, open structured aggregates of greater size than the original individual particles. A porous, open structure and increased size are the characteristics which are responsible for the increased flowability of the dry product, and increased wettability and dispersability of the aggregated product in liquids.

There are at the present time several types of commercially available apparatus for aggregating small particulate particles to produce products having improved flowability, wettability and dispersability. However, such devices have been designed particularly for the purpose of aggregating finely divided dry skim milk, or other easily aggregated materials. Such easily aggregated materials will readily sorb moisture when wetted, will stick together upon colliding after wetting, and will remain stuck or bonded together after being dried by warm air. Dried particles which do not possess all three of these characteristics have been difficult, if not impossible, to aggregate with prior known apparatus.

In order to aggregate certain difficult to aggregate materials, the present inventors have developed a novel method which can be utilized in present conventional aggregators. See co-pending application Serial No. 290,902, filed June 25, 1963, entitled Process for Aggregating Difficult to Aggregate Particles and the Product Thereof. However, the aggregate size obtainable by our method is sometimes limited by the design of such conventional aggregators. Therefore, we have developed the present apparatus to eliminate the limitations of the prior art devices.

It is a primary object of the present invention to provide apparatus for forming optimum sized aggregates of difficult to aggregate materials having improved flowability, wettability and dispersability.

It is a further object of the present invention to provide apparatus for aggregating difficult to aggregate materials which permits variation of the wetting time to provide the degree of aggregation desired.

It is a still further object of the present invention to provide apparatus for aggregating difficult to aggregate materials which gently dries the wetted aggregate formed therein with a minimum of attrition and aggregate break up.

It is an additional object of the present invention to provide an apparatus for aggregating difficult to aggregate materials which is extremely efficient, and which has a high capacity for a relatively small size.

It is a still further object of the present invention to provide an apparatus for aggregating difficult to aggregate materials which may be quickly and easily modified to aggregate a variety of such materials.

Other objects and advantages of the present invention will become obvious from the following detailed description taken in conjunction with the accompanying drawings wherein preferred embodiments of the present inventio have been selected for exemplification.

FIG. 2 shows a partial schematic side view, partially in section, of a modified form of the wetting section of the invention.

FIG. 3 shows a partial schematic side view, partially in section, of another modified form of the wetting section of the invention.

FIG. 4 is a section view taken at section line 4—4 of FIG. 3.

FIG. 5 is a graph illustrating the relationship between particle wetting time and average aggregate size for a particular material aggregated with our improved apparatus.

Figure 1:
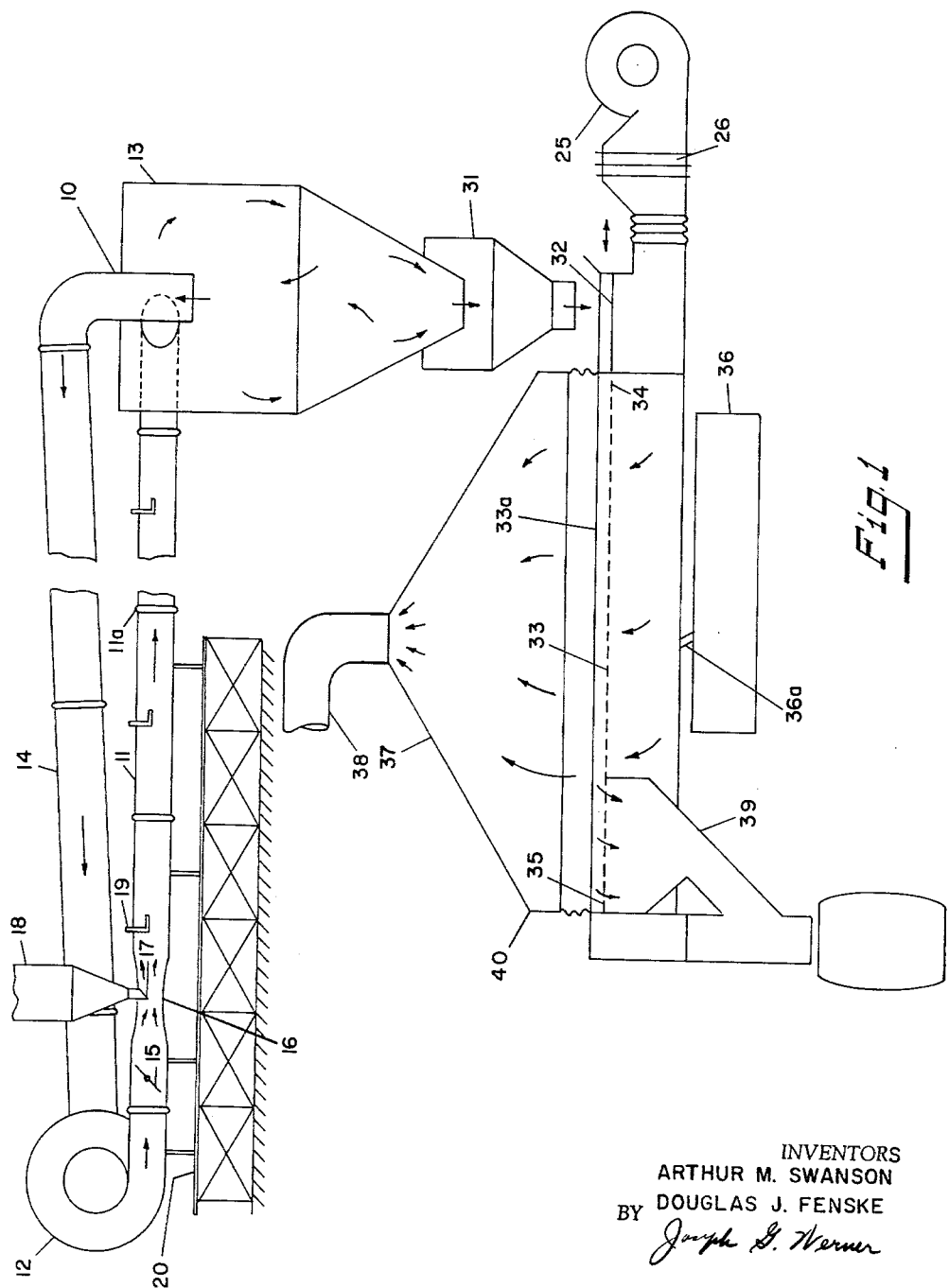
FIG. 1 shows a schematic side elevational view, partially in section, of a preferred form of the present invention.

Generally, our invention is characterized by an elongated wetting tube which is adapted to provide optimum extended wetting times, depending upon the hydroscopicity of the material being processed. Thus, for a material with a relatively low rate of water sorption, one would want to provide for a fairly long wetting time. Our invention is further characterized by its gentle redrying action, in which the wetted aggregates are dried with a minimum of aggregate attrition, thereby minimizing aggregate break up.

Referring more particularly to the drawings, in which like numerals refer to like parts, FIG. 1 shows a preferred form of our apparatus 10 having a wetting tube 11 of variable length, connected at one end to a blower 12 and communicating at the other end with a wet collector 13, which is preferably a cyclone collector. The length of the wetting tube 11 is preferably varied by uncoupling appropriate tube couplings 11a, and inserting or removing sections of tubing as desired. In practice, a typical wetting tube having a diameter of five inches may be operated at lengths varying from a few feet to 30 or 40 feet or more, depending upon the material being aggregated and the average aggregate size desired. A return tube 14 preferably extends from the approximate center of the wet cyclone 13 to the inlet of the blower 12. If employed, the return tube 14 should also be of variable length to permit varying the length of the return tube as the length of the wetting tube 11 is changed. If desired, the return tube 14 may be eliminated by drawing fresh air into the inlet of the blower 12, and exhausting air from the center of the wet cyclone 13 to the atmosphere. An air control damper 15 is preferably located in the wetting tube 11 adjacent to the blower 12 to control the flow of air therethrough. The flow of air through the wetting tube 11 may also be controlled by means of a variable speed blower if desired.

The inside diameter of the wetting tube 11 is preferably restricted at a point near the connection of the wetting tube 11 to the blower 12 to form a means for increasing the air turbulence therein. The restricted section 16 causes an increase in the velocity of air flow at that point, and greatly increases the turbulence of the air flowing therethrough. A powder supply tube 17, which may open at the restricted section 16, extends within the wetting tube 11. Powder may be supplied to the powder supply tube 17 at a desired rate by means of a hopper 18, as shown, or other suitable means such as a conventional fluidized powder feed. The powder is then pulled from hopper 18 into the wetting tube 11 by the partial vacuum existing at the restricted section 16, or is forced into the wetting tube by the fluidized powder feed.

Immediately downstream from the powder inlet and restricted section 16 may be located one or more steam inlet pipes 19 in communication with the inside of the wetting tube 11. Such steam inlet pipes 19 may be of any desirable configuration, one possible form of which may be a one-half inch diameter pipe extending toward the center of the wetting tube 11 and being bent near the center to exhaust the steam downstream. In a typical apparatus, the steam may be introduced into the wetting tube approximately 20 inches downstream from the powder inlet. Additional such steam inlet pipes may be employed either at the location of the pipe 19 shown in the drawings, or at various points within the wetting tube 11 both upstream and downstream from the pipe 19 to produce optimum wetting of the particles to be aggregated. The steam may be introduced into the wetting tube 11 as far upstream as the blower 12, if desired, and may even preferably be introduced into the apparatus on the inlet side of the blower 12. While steam has been found to be the preferable wetting medium, other means for introducing moisture into the wetting tube 11 may be employed, if effective to produce the necessary wetting of the particles to be aggregated.

The blower 12, and the adjacent section of the connected wetting tube 11 containing the air control damper 15, the powder supply tube 17 and the steam inlet 19 are preferably movable with respect to the wet cyclone collector 13 to permit lengthening or shortening the wetting tube 11. This may be accomplished by mounting the blower 12 and adjacent portions of the wetting tube 11 on a support track 20 as shown. The blower 12 and connected elements may be mounted on rollers (not shown) on the support track 20, or may merely be adapted to be supported by and bolted to the track at different positions as desired. The support track should, of course, be of sufficient length to permit use of a wetting tube 11 of whatever length is necessary to adequately wet the materials desired to be aggregated. The return tube 14 is preferably lengthened or shortened at the blower inlet, but portions of the tube 14 may be moved with the blower 12 if desired. In some installations, it may be preferable to maintain the blower 12 and the adjacent connected sections of the wetting tube 11 stationary and move the cyclone collector 13 and communicating elements to permit changing the length of the wetting tube 11 and return tube 14. In such a case, the cyclone collector 13 and communicating elements are preferably track mounted to facilitate their movement.

The wetting tube 11 preferably communicates with the wet cyclone 13 in substantially tangential relation. It has been found that the more nearly the wetting tube approaches a perfectly tangential relationship with the inner surface of the wet cyclone 13, the more efficiently the cyclone will operate. For example, when the connection is nearly tangential, there will be practically no build up of wetted material on the walls of the cyclone collector 13. However, when the connection is not tangential, a build up of aggregated materials tends to form on the side of the collector opposite the entrance of the wetting tube 11. This build up becomes more pronounced as the connection becomes less tangential. The return tube 14 extends downward into the wet cyclone 13 as shown, and returns the moist air from the wetting tube to the inlet of the blower 12 after the wetted aggregates have been separated therefrom.

The lower end of the wet cyclone 13 communicates with the drying unit wherein the wetted aggregates emitting from the lower end of the cyclone 13 are quickly and gently dried to produce the desired final product. As shown in FIG. 1, cyclone 13 empties the aggregates into wet hopper 31, from which the wetted aggregates are free to fall upon the drier feed tray 32. The feed tray 32 is attached in continuous relation to a small mesh screen 33 having a feed end 34 and an output end 35. The feed tray 32, and screen housing 33a are operatively connected to a conventional vibrator means 36 by arm 36a which causes the screen and feed tray to vibrate in such a manner that the aggregates deposited upon the feed tray 32 from wet hopper 31 are caused to travel slowly across the surface of the feed tray 32 and screen 33 toward the screen output end 35. Hot air blower 25 forces air through air heater 26 into screen housing 33a and upward through screen 33 and the moist aggregates supported thereon to gently dry the aggregates to the desired moisture content. Depending upon the material to be dried and the amount of moisture which must be removed therefrom, the drying air will typically be heated to a temperature of from 150° F. to 300° F. by heater 26. The air continues upward where it is collected by exhaust hood 37 and pipe 38. The exhaust hood 37 and screen housing 33a thus form a drying chamber 40 for the aggregates. The exhaust pipe 38 preferably contains a collector (not shown), of any suitable design adapted to separate out any fine particles of product suspended in the exhaust air. At the output end 35 of the screen 33 the mesh of the screen is enlarged to permit the dried aggregates to fall through into product hopper 39, from which the final product is removed for use.

FIG. 2 shows in schematic section a modified form of the wetting section of our apparatus. In the apparatus of FIG. 2, the blower 12, which may be of variable speed, has a fresh air intake 12a, and return tube 14 is eliminated. The wetting tube 11 is substantially identical to that of FIG. 1, and incorporates a restricted section 16 for increasing the turbulence of the air flow in the downstream sections of the wetting tube 11. In particular, the air flow through that portion 44 of the wetting tube 11 immediately downstream from the restricted section 16, which is designated "zone of high turbulence," is especially turbulent. This will cause a maximum number of collisions between the wetted particles borne in the turbulent air stream, thereby maximizing the opportunities for the wetted particles to adhere together to form aggregates.

Powder is preferably introduced into the wetting tube 11 of FIG. 2 at a point ahead of the restricted section 16, by means of fluidized powder feed 41. Steam is introduced under pressure into the tube 11 by steam pipe 42 at the restricted section 16 or immediately downstream therefrom, so that the powder particles introduced into the tube by fluidized powder feed 41 are wetted prior to entry or as they enter into the zone of high turbulence 44. Preferably the steam pipe 42 may be encompassed by an air pipe 43, as shown. The air pipe 43 will prevent powder from adhering to the hot steam pipe 42 during operation. The injection of compressed air through the air pipe 43 will also serve to increase the turbulence of the air flow and dispersion of steam within the wetting tube 11. While the relative locations of the powder feed pipe 41 and steam inlet pipe 42 may be varied, as desired, it is not usually desirable to inject both the steam and the powder into the wetting tube 11 upstream from the restricted section 16. Under such conditions the wetted powder may tend to adhere to the sides of the tube at the restricted section and plug up the apparatus.

FIGS. 3 and 4 illustrate still another modification of the wetting section of our novel apparatus. In the apparatus of FIGS. 3 and 4 the means for increasing the turbulence of the air flow within the wetting tube 11b comprises a plurality of vanes 48 extending inwardly from the walls of the tube and arranged to impart a turbulent, swirling motion to the air flow through the tube. The vanes 48 may be arranged in helical, spiral or other relation to impart the desired turbulent motion. The vanes 48 should preferably be located just upstream from the point at which the powder is wetted to provide the desired zone of high turbulence 44 at said point. The vanes 48 will thereby insure maximum turbulence as the particles are wetted to maximize the opportunities for the wetted particles to collide and adhere together to form the desired aggregates.

Moisture may preferably be introduced into the wetting tube 11b ahead of, or upstream from, the vanes 48 by means of steam pipe 49, which may inject steam into the air stream on the inlet side of blower 12, as shown in FIG. 3. Powder is then preferably forced into the wetting tube 11b immediately downstream from the vanes 48 by fluidized powder feed 41. Thus, the powder will be wetted and aggregated within the zone of high turbulence 44. Normally, the powder should not be wetted upstream from the vanes 48, as the wetted particles would have a tendency to "plaster" onto the vanes, resulting in plug-ups and cleaning problems.

FIG. 3 shows an additional feature of our invention which may be employed, as well, with the apparatus of FIGS. 1 and 2. Heating coils 50 or other suitable heating means may be employed to heat the air being drawn into blower 12 prior to forcing it through the wetting tube 11*b*. Preheating the air in this manner allows it to carry more moisture while maintaining the same relative humidity, and thereby increases the capacity of the apparatus to wet powder. Furthermore, by controlling the temperature of the incoming air, as well as the amount of moisture and powder introduced into the air, the relative humidity of the atmosphere within the wetting tube 11 or 11*b* may be held fairly constant for substantially the entire length of the tube, despite the fact that moisture is diffused to the powder. This is caused by the decrease in temperature along the length of the tube. Such constant relative humidity results in correspondingly constant wetting conditions throughout the length of the tube.

A typical operation of our novel aggregator apparatus is as follows:

Where the hydroscopicity of the material to be aggregated is known, the length of the wetting tube is adjusted to produce the wetting time necessary for the formation of the desired sized aggregates. The relationship between the wetting time of the particles and the average aggregate size is illustrated by the graph of FIG. 5, which shows the relationship with respect to a product containing 80% dried egg albumen and 20% amorphous lactose. This graph will be further described at a later point in the description.

The blowers 12 and 25 are then turned on, and the air entering the drying chamber 40 is heated to a desired inlet temperature by hot air heater 26. If heating coils 50 are employed, the air entering the wetting tube 11 or 11*b* will also be heated to the desired temperature. The flow of air through the wetting tube 11 is adjusted by means of air control damper 15, or by varying the speed of the blower 12 to obtain a velocity only slightly greater than that necessary to retain the wetted aggregates in suspension for the entire length of the tube 11. Thus the wetting time will depend upon both the length of the wetting tube 11 and the velocity of the air flow therethrough. Different materials may require different air velocities to retain the aggregates in suspension.

The material which is to be aggregated is then slowly fed into the powder supply tube 17, and the steam is admitted to the wetting tube 11 through steam inlet pipe 19 at a predetermined rate depending upon the type of material being processed. The steam thus wets the powder particles (which preferably include particles of aggregating agent as described in our co-pending application) whereupon the particles become sticky and adhere together upon collision within the turbulent air flow downstream from restricted section 16 in the wetting tube 11, or vanes 48 in wetting tube 11*b*. The powder feed rate is then increased to a desired level, and product collection is started at product hopper 39. As previously explained, the average aggregate size of the collected product is directly proportional to the length of the wetting time of the powder. The longer the wetting time of the powder, the greater the opportunity for the individual particles to sorb enough water to become sticky, and the greater the opportunity for such sticky particles to collide and adhere together before they are dried. Once such particles have adhered together to form aggregates of the desired size, the gentle drying action of our apparatus causes very little aggregate attrition and break-up during drying.

The wetting time of the powder may vary from about 0.01 second up to 1 second, depending upon the material being aggregated and the desired size of the aggregates. Such wetting times are easily achieved with our novel apparatus merely by varying the length of the wetting tube and the amount of the air flow therethrough. The minimum air velocity necessary to keep a given finely divided material in suspension for the entire length of the tube 11 is also dependent upon the type of the material and the size of the aggregates formed. The diameter of the wetting tube 11 of our aggregator is typically about 5 inches for the velocities given. However, the diameter of the tube 11 may be varied considerably depending upon the size of the unit and the types of materials which it is desired to aggregate.

The temperature within the wetting tube during operation may range from 130° F. to 280° F., depending on the material being aggregated. To achieve wetting temperatures in the higher areas of that range heater means such as the heating coils 50 shown in FIG. 3 will, of course, be necessary to preheat the wetting air. Typically, for maximum capacity, the wetting temperature will be as high as possible without risk of adversely affecting the material to be aggregated, a range of 190° F. to 200° F. being quite common.

As previously mentioned, the gentle action of the air within the drying chamber 40 minimizes aggregate attrition and break-up during drying. Prior devices designed primarily for use in aggregating non-fat milk products, such as Hartman, et al., U.S. Patent No. 2,934,434 and Huston, et al., U.S. Patent No. 2,912,768, have employed much higher air flow rates to dry the aggregates to the moisture level required, with correspondingly greater aggregate attrition. While such high drying air flow rates are not objectionable when aggregating non-fat milk products (since additional means are usually necessary to break up the large aggregates formed during the aggregation of such products) aggregates of less hydroscopic materials are much more fragile. The production capacity of the present invention will, of course, vary directly with changes in the size of the unit employed.

The process described in our co-pending application may be practiced with the apparatus described herein to produce a final product having an average aggregate size of 150 microns or greater. The larger aggregate size obtainable with our apparatus results in a product having better flowability, wettability, and dispersability than the product previously obtainable with prior devices.

A further advantage of the present apparatus when operated in accordance with the methods described in our co-pending application is that it permits successful aggregation of difficult to aggregate materials with a reduced proportion of such aggregating agent. It also may permit aggregation of some of the less difficult to aggregate materials without the addition of the various aggregating agents described therein.

One of the greatest advantages of the present novel apparatus is its flexibility. It can be used to aggregate many different difficult to aggregate materials merely by changing the length of wetting time, depending upon the relative ease of aggregating the particular material to be aggregated, to produce the average aggregate size desired. The desired wetting time for any particular product may be determined experimentally, or may be determined theoretically, based on the known aggregation characteristics of the product. For example, the curve shown on the graph of FIG. 5 has been experimentally determined by subjecting a mixture of 80% spray dried egg albumen and 20% amorphous lactose to various wetting times in our apparatus and determining the average aggregate size of the product formed thereby. If it is desired to aggregate such a mixture with such an apparatus, it is only necessary to look at the graph and find the approximate wetting time necessary to produce the desired average aggregate size. Thus, a relatively difficult to aggregate material will require a relatively long wetting time, whereas a less difficult to aggregate material will require a shorter wetting time. In practice, the correct wetting time can be quickly determined for any given material to be aggregated. The proper wetting tube length will then be that length necessary to produce the correct wetting time for the air velocity required to retain the particular material to be aggregated in suspension within the wetting tube.

Because of the long wetting times obtainable with our aggregator, and because of the high drying temperatures which permit drying a relatively large amount of powder with a relatively small amount of air, our aggregator apparatus is extremely efficient. Thus, it is seen that a relatively small unit in terms of physical size, will produce a relatively large amount of aggregated product per hour. Such an apparatus has the advantage of reducing the initial cost of the aggregator to the user, and of reducing the plant space requirements of the apparatus. Thus, the actual cost of the aggregated products produced thereby is reduced.

It is understood that the present invention is not limited to the particular embodiments herein illustrated and described, but embraces all such variations thereof as come within the scope of the following claims.

We claim:

1. An apparatus for aggregating difficult to aggregate finely divided particles which comprises:
   (a) an elongated wetting tube,
   (b) means attached to said wetting tube for introducing a substantially continuous flow of finely divided particles into said tube,
   (c) means for introducing a substantially continuous flow of moisture into said tube whereby to wet said particles,
   (d) a blower connected to one end of said wetting tube and being adapted to force a flow of turbulent air therethrough to carry said particles and moisture the length of said tube and cause said wetted particles to collide and adhere together in random fashion to form aggregates,
   (e) collector means attached to the other end of said wetting tube for separating said aggregates from said air flow,
   (f) a small mesh screen having a feed end and an output end,
   (g) said screen feed end being positioned with respect to said collector means such that the aggregates separated by said collector means will be deposited on said screen feed end,
   (h) means for vibrating said screen such that the aggregates deposited on such screen feed end move slowly across said screen toward said output end, and
   (i) means for directing a flow of hot air upward through said screen to gently dry the aggregates supported thereon.

2. The invention described in claim 1 wherein said wetting tube includes means for increasing the turbulence of the air within the portion of said tube wherein said particles are wetted to thereby increase the frequency of collisions between particles so wetted and the formation of aggregates of said particles.

3. The invention described in claim 1 wherein flow control means are provided for regulating the rate of air flow through the wetting tube.

4. The invention described in claim 1 wherein the wetting tube is of variable length and the distance between the blower and the collector may be readily varied to provide a particle wetting time of the duration desired.

5. The invention described in claim 1 wherein said collector means comprises a cyclone collector, and wherein an elongated return tube of selectively variable length extends from the approximate center of said cyclone collector to the inlet of said blower means.

6. The invention described in claim 1 wherein heater means are provided for preheating the air to be forced through said wetting tube by said blower.

7. An apparatus for aggregating difficult to aggregate finely divided material which comprises:
   (a) an elongated wetting tube of selectively variable length having an inlet end and an outlet end,
   (b) means attached to said wetting tube near said inlet end for introducing a substantially continuous flow of finely divided particles into said tube,
   (c) means for introducing a substantially continuous flow of steam into said tube whereby to wet said particles,
   (d) blower means in communication with said wetting tube inlet end,
   (e) said blower means being adapted to force a flow of turbulent air through said wetting tube to carry said finely divided particles introduced therein the length of said tube and cause said wetted particles to collide and adhere together in random fashion to form aggregates,
   (i) means for directing a flow of hot air upward in the portion of said wetting tube wherein said particles are wetted to thereby increase the frequency of collisions between particles so wetted and the formation of said aggregates,
   (g) flow control means for selectively regulating the rate of air flow through said wetting tube,
   (h) a cyclone collector in communication with said wetting tube outlet end and adapted to separate said moist aggregates from said air flow,
   (i) a dryer having a vibratable feeder screen with a feed end and an output end, (j) said screen feed end being located in such relation to said cyclone collector that the aggregates separated by said collector fall on said feed end,
(k) means for vibrating said screen such that said aggregates move across said screen from said feed end to said output end,
(l) means for forcing a flow of hot, dry air upward through said screen whereby to gentle dry the aggregates supported thereon.

References Cited by the Examiner

UNITED STATES PATENTS

| | | | |
|---|---|---|---|
| 1,761,149 | 6/1930 | Peebles | 34—57 |
| 2,406,395 | 8/1946 | Noel | 34—10 |
| 2,544,616 | 3/1951 | Sartorius | 34—10 |
| 2,912,768 | 11/1951 | Huston et al. | 34—10 |
| 3,012,331 | 12/1961 | Oholm et al. | 34—10 |

WILLIAM F. O'DEA, *Primary Examiner.*

UNITED STATES PATENT OFFICE
CERTIFICATE OF CORRECTION

Patent No. 3,228,116                      January 11, 1966

Arthur M. Swanson et al.

It is hereby certified that error appears in the above numbered patent requiring correction and that the said Letters Patent should read as corrected below.

Column 8, lines 64 and 65, strike out "(i) means for directing a flow of hot air upward in" and insert instead -- (f) means for increasing the turbulence of the air within ·

Signed and sealed this 6th day of December 1966.

(SEAL)
Attest:

ERNEST W. SWIDER
Attesting Officer

EDWARD J. BRENNER
Commissioner of Patents